Sept. 2, 1969     G. E. BISHOP ET AL     3,465,222

AUTOMATIC DIRECTION CONTROL FOR AN ELECTRICAL MOTOR

Filed Aug. 17, 1966

*INVENTORS*
GEORGE E. BISHOP
DONALD L. McMANIS

BY *Marvin Moody*

ATTORNEY

United States Patent Office 3,465,222
Patented Sept. 2, 1969

3,465,222
AUTOMATIC DIRECTION CONTROL FOR AN ELECTRICAL MOTOR
George E. Bishop, Cedar Rapids, and Donald L. McManis, Marion, Iowa, assignors to Collins Radio Company, Cedar Rapids, Iowa, a corporation of Iowa
Filed Aug. 17, 1966, Ser. No. 573,077
Int. Cl. G05b 5/00
U.S. Cl. 318—33   7 Claims

ABSTRACT OF THE DISCLOSURE

Control circuitry including a diode matrix interconnecting contacts at a controlling station and contacts at a controlled station whereby a signal applied to a contact at the controlling station will not pass to the equivalent contact at the controlled station but will pass to other contacts at the controlled station depending on signal polarity. A motor controlled element is positioned by energizing the motor through the diode matrix until a contact at the controlled station corresponding to a contact at the controlling station is detected.

---

This invention relates in general to a control system and, in particular, to a polarized control system which causes a controlled unit to move in a direction determined by the position of a controlling unit.

Servosystems are used in many applications and it is an object of the present invention to provide a control circuit for a servosystem which is polarized such that the controlled unit moves in a predetermined direction relative to the controlling unit.

Another object of the invention is to provide an improved polarized control system.

A feature of this invention is found in the provision for electrical connections between a controlled unit and a controlling unit which include a plurality of diodes so that the movement of the controlled unit bears a predetermined relationship to the movement of the controlling unit.

Further features, objects, and advantages of this invention will become apparent from the following description and claims when read in view of the accompanying drawings, in which:

Figure 1:
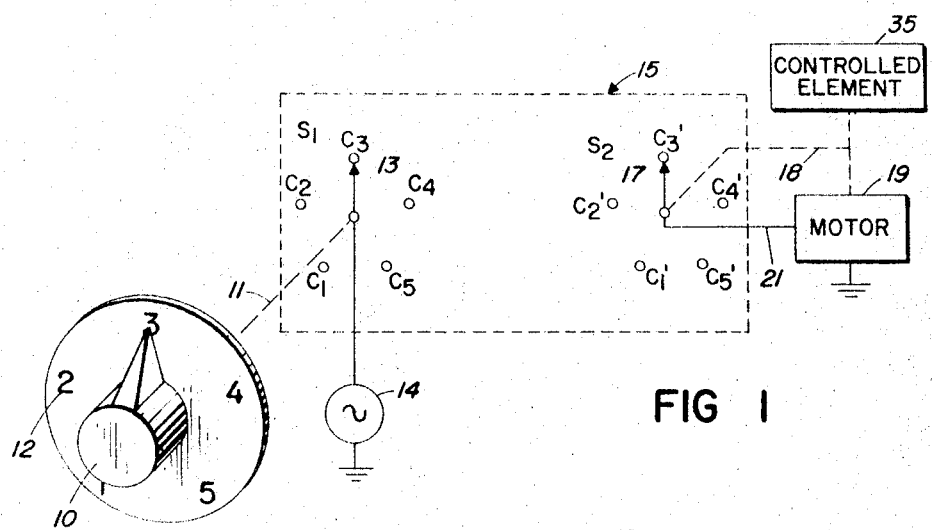
FIGURE 1 illustrates a controlling station connected to a controlled station.

FIGURE 1 illustrates a control knob 10 which is mounted on a shaft 11. Indicia 12 are arranged about the knob 10 and a knob detent means is provided so that the knob 10 stops in one of the predetermined indicated positions.

The shaft 11 is connected to a movable contact 13 of a switch $S_1$ which engages fixed contact points $C_1$ through $C_5$ which are spaced about the switch contact 13 in alignment with the indicia 12. A power source which might be, for example, an alternating current supply 14 is electrically connected to the contact 13 and has its other side connected to ground.

A controlled circuit 15 according to this invention is indicated by the dotted box in FIGURE 1 and connects the switch contacts $C_1$ through $C_5$ with contacts $C_1'$ of a controlled switch unit $S_2$ mounted at a remote location. A movable contact 17 is rotatably supported by shaft 18 and is engageable with contacts $C_1'$ through $C_5'$. A motor 19 has one terminal connected to the contact 17 and the other side connected to ground. The motor 19 might be, for example, a D-C motor with a fixed magnetic field and the lead 21 may be connected to its armature. The output shaft of the motor is connected to shaft 18 to control the movable contact 17.

Figure 2:
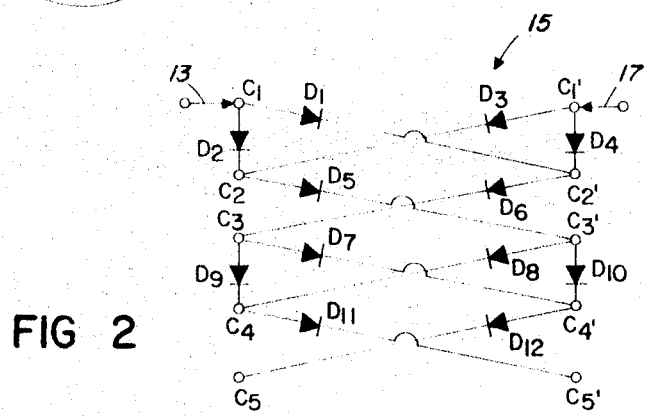
FIGURE 2 illustrates the controlling circuit according to this invention.

The control circuit of this invention is shown in FIGURE 2. For simplicity of layout, the contacts $C_1$ through $C_5$ and contacts $C_1'$ through $C_5'$ are shown vertically rather than on a circle. Contact $C_1$ is connected through diode $D_1$ to contact $C_2'$ such that positive current may pass from terminal $C_1$ to $C_2'$. Contact $C_1$ is also connected to contact $C_2$ through diode $D_2$ such that positive current can pass from contact $C_1$ to $C_2$. Contact $C_1'$ is connected to contact $C_2$ through a diode $D_3$ poled so that positive current can pass from $C_1'$ to $C_2$. Contact $C_1'$ is also connected to contact $C_2'$ through diode $D_4$ so that positive current may pass from $C_1'$ to $C_2'$. Contact $C_2$ is connected through diode $D_5$ to contact $C_3'$ and contact $C_2'$ is connected to $C_3$ through diode $D_6$. Contact $C_3$ is connected to contact $C_4'$ through diode $D_7$. Contact $C_3'$ is connected to contact $C_4$ through diode $D_8$. Contact $C_3$ is also connected to contact $C_4$ through diode $D_9$. Contact $C_3'$ is connected to contact $C_4'$ through diode $D_{10}$. Contact $C_4$ is connected to contact $C_5'$ through diode $D_{11}$ and contact $C_4'$ is connected to contact $C_5$ through diode $D_{12}$.

The controlled circuit of FIGURE 2 when connected in FIGURE 1 results in a control circuit such that when contact 13 engages a higher number position $C_1$ through $C_5$ than contact 17 the motor lead 21 will have a positive voltage applied to it which will cause the motor to operate in a first direction until the contact 17 is on the contact corresponding to that which contact 13 engages. When both switches 13 and 17 are on the corresponding contacts of switches $S_1$ and $S_2$, an open circuit exists between the controlling and controlled stations and the motor will stop.

When the controlling switch 13 is on a lower number contact than the controlled switch 17, lead 21 will supply a negative voltage to the motor 19 and the motor will run in a direction opposite to that at which it runs when the motor voltage is positive. Therefore, the contact 17 will move in a direction which is dependent upon the relative positions of switch contacts 13 and 17 until they are on corresponding contacts at which time the motor will stop. The position and poling of the diodes as shown assures that current will flow between contacts 13 to 17 in a direction which is determined by the relative positions of the contacts 13 and 17 and this results in the motor 19 rotating in a direction which is dependent upon the relative positions of the contacts 13 and 17. Contacts 13 and 17 are suitably detented so that they only stop when engaging a contact.

Figure 3:
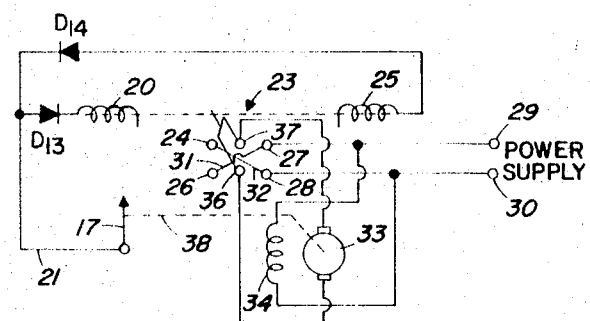
FIGURE 3 illustrates a modification of the invention.

FIGURE 3 illustrates a modification of the invention wherein the lead 21 is connected to additional diodes $D_{13}$ and $D_{14}$ which are oppositely poled and have first sides connected together and to lead 21. The other side of $D_{13}$ is connected to energizing relay 20 of a forward power relay and the other side of diode $D_{14}$ is connected to energizing coil 25 of a reverse power relay. The other sides of relays 20 and 25 are connected to ground. A reversing switch 23 has a movable contact which is controlled by relays 20 and 25. When relay 20 is energized, switch 23 moves to engage contacts 24 and 26 and when relay 25 is energized, switch 23 moves to engage contacts 27 and 28. A suitable power supply is connected to terminals 29 and 30 which in turn are connected to terminals 27 and 28. Reversing leads 31 and 32 connect contact 27 to 26 and contact 28 to 24, respectively. A motor 33 has its field connected across power terminals 29 and 30 and has its armature 34 connected to the opposite sides of the movable contact of the switch 23. Movable contacts are numbered 36 and 37, respectively.

The modification of FIGURE 3 allows a motor 33 of high power to be controlled in direction and position by the controlled circuit 15 but the motor power is supplied by an operating power source connected to terminals 29 and 30. The only power supplied by the source 14 through control circuit 15 is sufficient power to energize the relays 20 and 25. The output shaft 38 of the motor 33 is connected to contact 17 as in FIGURE 1. It is to be realized that shaft 18 of motor 19 is connected to a controlled element 35 to move it in response to movement of knob 10. The controlled element could be any type of element which varies with shaft position.

It is seen that this invention provides means for controlling a follow-up system such that the controlled element moves in a direction determined by its position relative to the controlling element and although it has been described with respect to preferred embodiments thereof, it is not to be so limited, as changes and modifications may be made therein which are within the spirit and scope of the invention as defined by the appended claims.

We claim:

1. A control circuit comprising a first plurality of contacts at a controlling station, a second equivalent number of contacts at a controlled station, first of said contacts at each station connected through diodes to second contacts at the other station, the first contacts at each station connected through diodes to the second contacts at the same station, said diodes defining a matrix whereby a signal applied to a contact at the controlling station will not pass to the equivalent contact at the controlled station and will pass to other contacts at the controlled station depending on signal polarity.

2. In apparatus according to claim 1, means for applying a signal of variable polarity to one of the contacts at the controlling station.

3. In apparatus according to claim 2, means for detecting a signal at one of the contacts at the controlled station.

4. In apparatus according to claim 3, means operative in a direction dependent upon the polarity of a signal electrically and mechanically connected to the detecting means at the controlled station to move the detecting means to the contact equivalent to the contact at which the controlling signal is applied at the controlling station.

5. In apparatus according to claim 1, second contacts at each station connected to third contacts at the other stations, and a diode mounted in each such connection and poled so that a controlling signal can pass in only one direction through the connection.

6. In apparatus according to claim 5, wherein any desired number of contacts at the controlling and controlled station may be utilized by connecting odd numbered contacts at the controlling and controlled station to the next higher number contacts at the other station and also connecting the odd numbered contacts to the next higher numbered contacts at the same station, and connecting each even numbered contact at both stations to the next higher numbered contacts at the other station and with a diode mounted in each connection.

7. In apparatus according to claim 6, means for applying a signal of varying polarity to one of the contacts of the controlling station, and means for detecting a signal at one of the contacts of the controlled station, and driving means connected to the detecting means electrically and mechanically to move the detecting means until it engages the equivalent contact to which the signal is applied at the controlling station.

References Cited

UNITED STATES PATENTS

| | | | |
|---|---|---|---|
| 2,814,013 | 11/1957 | Schweighofer | 318—33 XR |
| 3,286,146 | 11/1966 | Ohlsen et al. | 318—33 XR |
| 3,286,150 | 11/1966 | Wilson et al. | 318—245 |
| 3,290,575 | 12/1966 | Modiano | 318—293 XR |
| 3,295,037 | 12/1966 | Bullene | 318—269 XR |
| 3,378,742 | 4/1968 | Telkamp | 318—33 |

B. DOBECK, Primary Examiner

UNITED STATES PATENT OFFICE
CERTIFICATE OF CORRECTION

Patent No. 3,465,222                         September 2, 196

George E. Bishop et al.

It is certified that error appears in the above identified patent and that said Letters Patent are hereby corrected as shown below:

Column 1, line 66, after "$C_1'$" insert -- through $C_5'$ --

Signed and sealed this 21st day of April 1970.

(SEAL)
Attest:

Edward M. Fletcher, Jr.                     WILLIAM E. SCHUYLER,
Attesting Officer                              Commissioner of Pate